US012380359B2

(12) United States Patent
Mu et al.

(10) Patent No.: US 12,380,359 B2
(45) Date of Patent: Aug. 5, 2025

(54) CONSTRAINT SAMPLING REINFORCEMENT LEARNING FOR RECOMMENDATION SYSTEMS

(71) Applicant: ADOBE INC., San Jose, CA (US)

(72) Inventors: Tong Mu, Cypress, CA (US); Georgios Theocharous, San Jose, CA (US); David Arbour, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1141 days.

(21) Appl. No.: 17/174,944

(22) Filed: Feb. 12, 2021

(65) Prior Publication Data

US 2022/0261683 A1  Aug. 18, 2022

(51) Int. Cl.
*G06N 20/00* (2019.01)
*G06N 5/04* (2023.01)
*G06N 7/01* (2023.01)
*G06N 3/02* (2006.01)
*G06N 3/08* (2023.01)
*H04L 67/50* (2022.01)

(52) U.S. Cl.
CPC .............. *G06N 20/00* (2019.01); *G06N 5/04* (2013.01); *G06N 7/01* (2023.01); *G06N 3/02* (2013.01); *G06N 3/08* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 8,166,029 B2 * | 4/2012 | Park | G06F 16/78 707/732 |
| 10,162,815 B2 * | 12/2018 | Lehman | G06F 40/35 |
| 10,311,467 B2 * | 6/2019 | Ghavamzadeh | G06Q 30/0269 |
| 10,686,843 B2 * | 6/2020 | Yuan | H04L 63/205 |
| 11,068,285 B2 * | 7/2021 | Sheoran | G06N 3/044 |
| 11,508,173 B2 * | 11/2022 | Mehra | G06N 3/045 |
| 2014/0188926 A1 * | 7/2014 | Chandel | G06F 16/435 707/767 |
| 2016/0283970 A1 * | 9/2016 | Ghavamzadeh | G06Q 30/0269 |
| 2017/0308535 A1 * | 10/2017 | Agarwal | G06F 16/24578 |
| 2017/0337478 A1 * | 11/2017 | Sarikaya | G06F 40/35 |
| 2018/0039946 A1 * | 2/2018 | Bolte | G06Q 50/2057 |
| 2018/0068658 A1 * | 3/2018 | Lehman | G06F 40/35 |

(Continued)

OTHER PUBLICATIONS

Auer, "Using Confidence Bounds for Exploitation-Exploration Tradeoffs", Journal of Machine Learning Research, 3 (Nov), pp. 397-422, 2002.

(Continued)

*Primary Examiner* — Maikhanh Nguyen
(74) *Attorney, Agent, or Firm* — F. CHAU & ASSOCIATES, LLC

(57) ABSTRACT

Systems and methods for sequential recommendation receive a user interaction history including interactions of a user with a plurality of items, select a constraint from a plurality of candidate constraints based on lifetime values observed for the candidate constraints, wherein the lifetime values are based on items predicted for other users using a recommendation network subject to the candidate constraints, and predict a next item for the user based on the user interaction history using the recommendation network subject to the selected constraint.

19 Claims, 8 Drawing Sheets

(56) References Cited

U.S. PATENT DOCUMENTS

| | | | |
|---|---|---|---|
| 2018/0218080 A1* | 8/2018 | Krishnamurthy | ... G06F 16/9535 |
| 2018/0336490 A1* | 11/2018 | Gao | ......... G06N 20/00 |
| 2018/0342004 A1* | 11/2018 | Yom-Tov | ......... G06N 20/00 |
| 2018/0365025 A1* | 12/2018 | Almecija | ......... G06F 3/0482 |
| 2019/0207985 A1* | 7/2019 | Yuan | ......... H04L 63/205 |
| 2019/0295004 A1* | 9/2019 | Chaturapruek | ....... G06F 18/214 |
| 2019/0311279 A1* | 10/2019 | Sinha | ......... G06F 17/11 |
| 2020/0118145 A1* | 4/2020 | Jain | ......... G06Q 30/02 |
| 2020/0169593 A1* | 5/2020 | Katsavounidis | ..... H04N 19/176 |
| 2021/0326674 A1* | 10/2021 | Liu | ......... G06Q 30/0282 |
| 2022/0245141 A1* | 8/2022 | Aggarwal | ......... G06N 3/08 |

OTHER PUBLICATIONS

Auer, et al., "Near-optimal Regret Bounds for Reinforcement Learning", In Advances in neural information processing systems, pp. 89-96, 2009.

Berner, et al., "Dota 2 with Large Scale Deep Reinforcement Learning", arXiv preprint arXiv:1912.06680, 2019, 66 pages.

Chen, et al., "How Serendipity Improves User Satisfaction with Recommendations? A Large-Scale User Evaluation", In the World Wide Web Conference, pp. 240-250, 2019.

De Farias, et al., "On Constraint Sampling in the Linear Programming Approach to Approximate Dynamic Programming", Mathematics of operations research, 29(3), pp. 462-478, 2004.

Efroni, et al., "Exploration-Exploitation in Constrained MDPs", arXiv preprint arXiv:2003.02189, 2020, 44 pages.

Harper, et al., "The MovieLens Datasets: History and Context", ACM Transactions on Interactive Intelligent Systems, (THIS), 5(4), pp. 1-19, 2015.

Javari, et al., "A probabilistic model to resolve diversity-accuracy challenge of recommendation systems", Knowledge and Information Systems, 44(3), pp. 609-627, 2015.

Kaminskas, et al., "Diversity, Serendipity, Novelty, and Coverage: A Survey and Empirical Analysis of Beyond-Accuracy Objectives in Recommender Systems", ACM Transactions on Interactive Intelligent Systems (TiiS), 7(1), pp. 1-42, 2016.

Komiak, et al., "The Effects of Personalization and Familiarity on Trust and Adoption of Recommendation Agents", MIS Quarterly, pp. 941-960, 2006.

Kotkov, et al., "A Survey of Serendipity in Recommender Systems", Knowledge-Based Systems, 111, pp. 180-192, 2016.

Kunaver, et al., "Diversity in recommender systems—A survey", Knowledge-Based Systems, 123, pp. 154-162, 2017.

McNee, et al., "Being Accurate is Not Enough: How Accuracy Metrics Have Hurt Recommender Systems", In CHI'06 extended abstracts on Human factors in computing systems, pp. 1097-1101, 2006.

Nilashi, et al., "Recommendation quality, transparency, and website quality for trust-building in recommendation agents", Electronic Commerce Research and Applications, 19, pp. 70-84, 2016.

Pandey, et al., "Recommending Serendipitous Items using Transfer Learning", In Proceedings of the 27th ACM international conference on information and knowledge management, pp. 1771-1774, 2018.

Silver, et al., "Mastering the Game of Go without Human Knowledge", nature, 550(7676), pp. 354-359, 2017.

Strehl, et al., "An analysis of model-based Interval Estimation for Markov Decision Processes", Journal of Computer and System Sciences, 74(8), pp. 1309-1331, 2008.

Theocharous, et al., "Reinforcement Learning for Strategic Recommendations", arXiv preprint arXiv:2009.07346, 2020, 45 pages.

Warlop, et al., "Fighting Boredom in Recommender Systems with Linear Reinforcement Learning", In Advances in Neural Information Processing Systems, pp. 1757-1768, 2018.

* cited by examiner

Algorithm 1: Constraint Sampling Reinforcement Learning

Input: Set of constraints $C$;
Initialization: $t = 0$, $L_i = [\ ] \forall i \in [|C|]$, $\forall A_i [\ ] \exists |A_i| = |C|$, reward and dropout parameters;
for *Users* $h = 1, 2, 3, \ldots$ do

Set optimistic constraint estimates $\tilde{J}(c_i) = \frac{\sum_{l_j \in L_{c_i}} l_j}{(\max_h L_{c_j})|L_{c_i}|} + u_{c_i}, \forall i \in [|C|]$;

Choose constraint index $i \leftarrow \arg\max_i \tilde{J}(c_i)$;

Set constraint for user as the $i^{th}$ constraint in the set $c_h \leftarrow C[i]$;

$l_h = 0$;        // $l_h$ tracks the lifetime value for user $h$ if $c_h \neq c_{h-1}$ then
    Compute policy $\tilde{\pi}_h$ for constrained MDP$(S, A, f, \tilde{r}_t, \tilde{p}_t, c_h)$;

while *user $h$ not dropped out* do
    Choose action $a_t \sim \tilde{\pi}_h$;
    Observe reward $r_t$, dropout status $d_t$ and next state $s_{t+1}$;
    $l_h \leftarrow l_h + r_t$;
    if *Update Criteria Met* then
        Update $\tilde{r}_t$ and $\tilde{p}_t$ using UCRL;
        Compute policy $\tilde{\pi}_h$ for CMDP$(S, A, f, \tilde{r}_t, \tilde{p}_t, c_h)$ $L_{c_h} \leftarrow [L_{c_h}, l_h]$

FIG. 7

CONSTRAINT SAMPLING REINFORCEMENT LEARNING FOR RECOMMENDATION SYSTEMS

BACKGROUND

The following relates generally to recommendation systems, and more specifically to sequential recommendation.

Sequential recommendation refers to the task of collecting data relating to user interactions, modelling user behavior, and using the model to predict items that users are likely to interact with. For example, a user may stream a set of songs on an online music streaming application, and a server can predict a next song that the user is likely to listen to.

Conventionally, recommendation systems are trained on a large number of episodes, and focus primarily on achieving accurate recommendations. For example, in a music streaming service context, conventional recommendation systems predict and recommend songs that the user is most probable to rate highly (i.e., the accuracy factor).

However, conventional recommendation systems do not take into account other factors that are important to user satisfaction, such as diversity and novelty. Over time, user satisfaction may decrease due to boredom having not exposed to media items or genres that the user may also find interesting. Therefore, there is a need in the art for an improved recommendation system that can provide users with novel and interesting options to achieve long term user satisfaction.

SUMMARY

The present disclosure describes systems and methods for sequential recommendation. One or more embodiments of the disclosure provide a recommendation network trained using reinforcement learning techniques, where the recommendation network is subject to a selected constraint. In some examples, the recommendation network applies an online constraint sampling reinforcement learning (RL) algorithm which is executed to optimize for lifetime values or rewards. In some cases, the constraint sampling RL algorithm takes into account accuracy, diversity, novelty, and other factors that may have impact on user satisfaction.

A method, apparatus, and non-transitory computer readable medium for sequential recommendation are described. Embodiments of the method, apparatus, and non-transitory computer readable medium are configured to receive, at a policy component of a recommendation network, a user interaction history including interactions of a user with a plurality of items, wherein the recommendation network comprises a reinforcement learning model; select, using a constraint component of the recommendation network, a constraint from a plurality of candidate constraints based on lifetime values observed for the candidate constraints, wherein the lifetime values are based on items predicted for other users using the recommendation network subject to the candidate constraints; and predict, using the recommendation network, a next item for the user based on the user interaction history and subject to the selected constraint.

An apparatus and method for sequential recommendation are described. Embodiments of the apparatus and method include a constraint component configured to select a constraint from a plurality of candidate constraints based on lifetime values observed for the candidate constraints, a policy component configured to predict next items for a user based on a user interaction history, wherein the next items are selected subject to the constraint, and a learning component configured to identify a lifetime value for the user and update parameters of a recommendation network based on the identified lifetime value.

A method, apparatus, and non-transitory computer readable medium for training a recommendation network are described. Embodiments of the method, apparatus, and non-transitory computer readable medium are configured to identify a plurality of candidate constraints based on predictions about user preferences, select a constraint from the plurality of constraints for each of a plurality of users, observe interactions of the users with items from a set of candidate items, select next items from the set of candidate items using a recommendation network based on the observed interactions, compute lifetime values for the users based at least in part on the selected next items, and update parameters of the recommendation network based on the lifetime values.

BRIEF DESCRIPTION OF THE DRAWINGS

FIG. 7 shows an example of a constraint sampling reinforcement learning algorithm according to aspects of the present disclosure.

DETAILED DESCRIPTION

Figure 1:
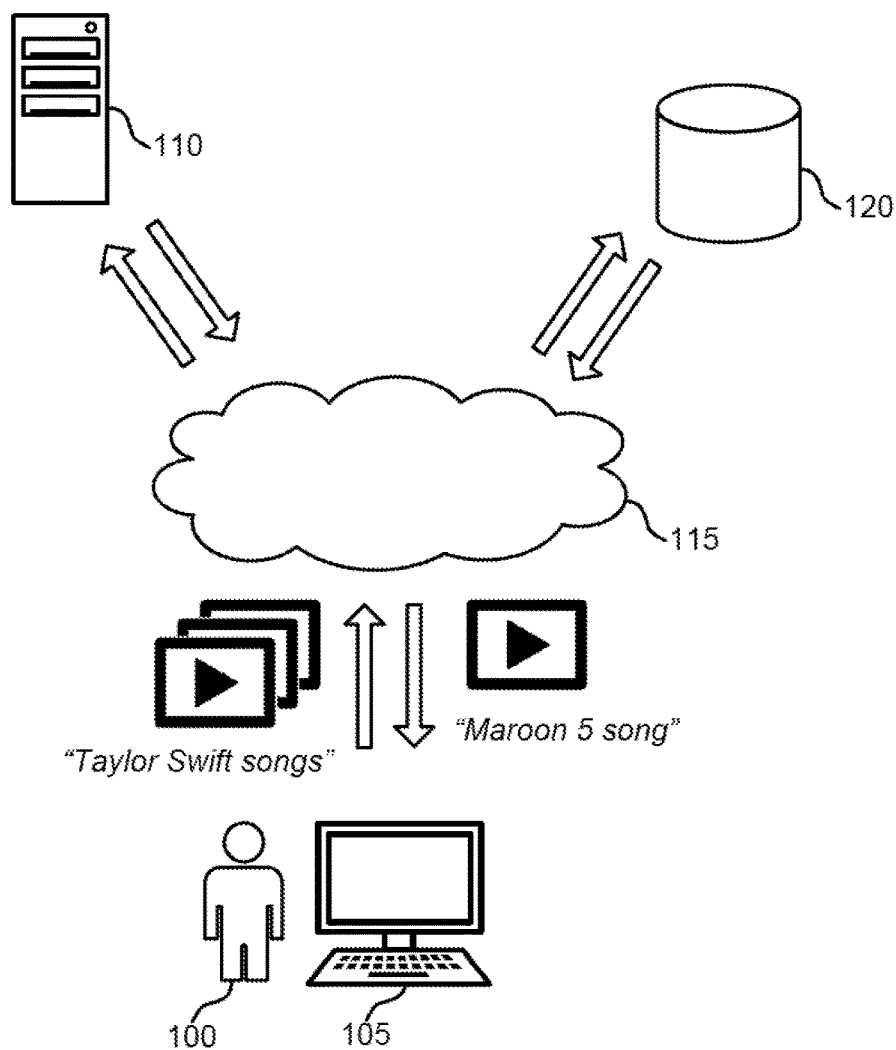
FIG. 1 shows an example of a system for sequential recommendation according to aspects of the present disclosure.

The present disclosure describes systems and methods for sequential recommendation. One or more embodiments of the disclosure provide a recommendation network trained using reinforcement learning techniques, where the recommendation network is subject to a selected constraint. For example, the recommendation network applies an online constraint sampling reinforcement learning (RL) algorithm which is executed to optimize for lifetime rewards or values. In some cases, constraint sampling RL algorithm takes into account factors such as accuracy, diversity and novelty that may have impact on user satisfaction.

Some sequential recommendation systems (i.e., search engines) use reinforcement learning (RL) algorithms to recommend a next item for users to consume (e.g., on third-party applications such as online gaming, media streaming services). During the learning process, these RL algorithms typically depend on a large number of episodes to learn a good policy and may have poor performance at an early stage of the learning process. Furthermore, these systems prioritize short term accuracy, and users eventually express low satisfaction and drop out of the system.

One or more embodiments of the present disclosure provide an improved recommendation network that tracks reward probabilities and dropout probabilities and learns based on a lifetime value. The improved recommendation system learns to maximize lifetime more quickly than tradition RL models by selecting constraints to apply to the RL network (e.g., diversity and novelty constraints) and learning which constraints are appropriate for different users (e.g., based on user characteristics or interaction history). Certain embodiments of the present disclosure take into account accuracy, diversity, novelty, and other factors that may have impact on general user satisfaction with an online service (e.g., video game, e-commerce, streaming service provider).

In some embodiments, the recommendation network applies a constraint sampling reinforcement learning algorithm. The RL algorithm includes multiple constraints which are preselected, e.g., based on prior knowledge or findings about human psychology, as input at an early stage to accelerate learning of the policy network. The RL algorithm outputs the best constraint for the policy component to follow. The recommendation network take into account factors such as diversity and novelty in addition to accuracy. As a result, training efficiency of a policy network and user satisfaction are increased.

Embodiments of the present disclosure may be used in the context of sequential recommendation. For example, a recommendation network based on the present disclosure may take a user interaction history on third party applications (e.g., YouTube®, Steam®, Netflix®) and efficiently search through millions of media items and predict a next item for the user. An example of an application of the inventive concept in the music streaming context is provided with reference to FIGS. 1 and 2. Details regarding the architecture of an example recommendation network are provided with reference to FIGS. 3 and 4. Examples of a process for predicting a next item for a user are provided with reference to FIGS. 5 and 6. An example of a constraint sampling reinforcement learning algorithm is provided with reference to FIG. 7. A description of an example training process is described with reference to FIG. 8.

Sequential Recommendation Application

FIG. 1 shows an example of a system for sequential recommendation according to aspects of the present disclosure. The example shown includes user 100, user device 105, recommendation apparatus 110, cloud 115, and database 120. Recommendation apparatus 110 is an example of, or includes aspects of, the corresponding element described with reference to FIG. 3.

In the example of FIG. 1, the user 100 communicates with the recommendation apparatus 110 via the user device 105 and the cloud 115. For example, the user 100 interacts with a music streaming service application (e.g., YouTube® Music). The user 100 has listened to Taylor Swift album including a set of Taylor Swift songs. The recommendation apparatus 110 receives a user interaction history including interactions of a user with a set of items. In the example above, the recommendation apparatus 110 receives the interaction history including the set of Taylor Swift songs.

The recommendation apparatus 110 incorporates prior findings and observations stored in the database 120. Based on prior findings, the recommendation apparatus 110 constructs constraints on a subsequent policy to avoid policies that prior findings already suggest suboptimal. In some examples, the recommendation apparatus 110 can construct a set of useful constraints, each of which an algorithm designer hypothesizes, but does not need to be certain. The recommendation apparatus 110 selects a constraint from a set of candidate constraints based on lifetime values observed for the candidate constraints, wherein the lifetime values are based on items predicted for other users using a recommendation network subject to the candidate constraints.

The recommendation apparatus 110 predicts a next item for the user based on the user interaction history using the recommendation network subject to the selected constraint. The recommendation apparatus 110 determines (e.g., through a policy) that the user 100 may not want to listen to songs from the same album or from the same singer to avoid boredom. But the user 100 would also prefer songs that are similar in styles/genres to the user's previous interaction history. In the example above, the recommendation apparatus 110 predicts that the user 100 likes a Maroon 5 song after considering factors including novelty, accuracy, and diversity.

Embodiments of the present disclosure are not limited to audio files, and other types of media may be used. In some examples, a predicted item is of a different media type than the items from the user interaction history. For example, user interacts with audio files, and a recommendation can be a video file. In some examples, recommendations themselves include different media types (e.g., audio files, video files, image files, and text files). The process of using the recommendation apparatus 110 to perform a sequential recommendation is further described with reference to FIG. 2.

The user device 105 may be a personal computer, laptop computer, mainframe computer, palmtop computer, personal assistant, mobile device, or any other suitable processing apparatus. A user interface may be implemented on the user device 105 to access item recommendations from the recommendation apparatus 110. A user interface may enable a user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

In some embodiments, the recommendation apparatus 110 applies an upper confidence reinforcement learning (UCRL) based algorithm, referred to as constraint sampling reinforcement learning (RL). The constraint sampling RL algorithm takes as input a set of constraints and tracks optimistic estimates of the value associated with each constraint. The constraint sampling RL algorithm then optimistically samples over them to be applied during learning. If some of the constraints in the set are good, the recommendation apparatus 110 can learn a best constraint to follow faster than learning the full dynamics. As a result, the recommendation apparatus 110 becomes faster in learning and leads to fewer users who have a poor experience (e.g., third-party service applications such as online education, gaming, music streaming services).

The recommendation apparatus 110 may also include a processor unit, a memory unit, a learning component, and a recommendation network. The learning component is used to train the recommendation network of the recommendation apparatus 110. Additionally, the recommendation apparatus 110 can communicate with the database 120 via the cloud 115. In some cases, the architecture of the recommendation apparatus 110 is also referred to as a recommendation system. Further detail regarding the architecture of the recommendation apparatus 110 is provided with reference to FIGS. 3 and 4. Further details regarding the operation of recommendation apparatus 110 is provided with reference to FIGS. 5 and 6.

In some cases, the recommendation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction.

Figure 2:
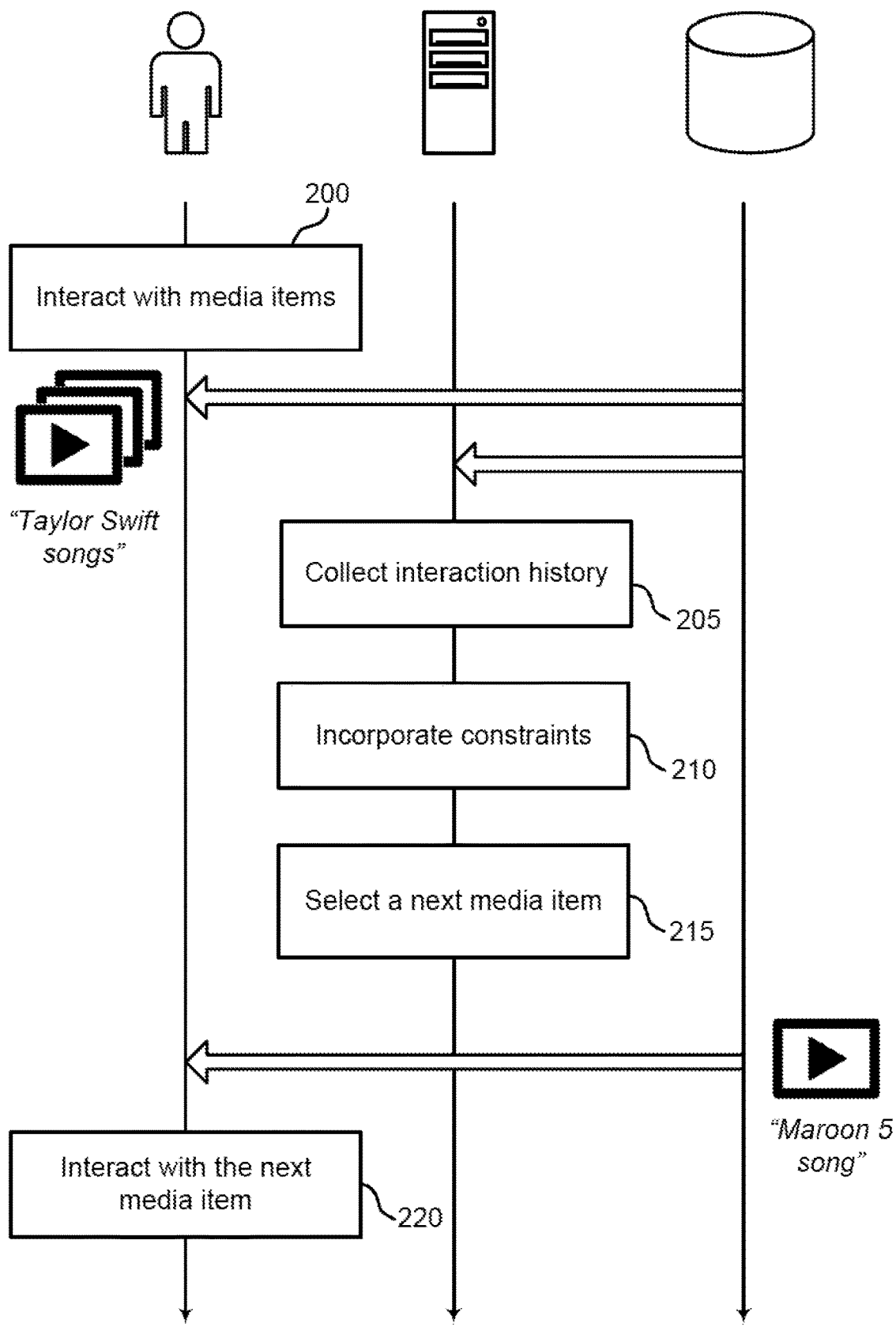
FIG. 2 shows an example of a process for sequential recommendation according to aspects of the present disclosure.

FIG. 2 shows an example of a process for sequential recommendation according to aspects of the present disclosure. In some examples, these operations are performed by a system such as the recommendation system of claim 1. The system may include a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user interacts with media items. In an example, the user enjoys a Taylor Swift album and has listened to a set of Taylor Swift songs. The user interaction history is then passed to the recommendation system (represented by a server icon) from a database. In some cases, the operations of this step refer to, or may be performed by, a user as described with reference to FIG. 1.

At operation 205, the system collects interaction history. The interaction history includes interactions of a user with a set of items (e.g., audio files). In the example above, the interaction history includes the set of Taylor Swift songs. The interaction history is temporarily or permanently stored in a database. The system collects the interaction history via a cloud. In some cases, the operations of this step refer to, or may be performed by, a recommendation apparatus as described with reference to FIG. 1.

At operation 210, the system incorporates constraints. In some examples, application domains have a large body of human psychology or human-computer interaction (HCI) prior work studying influential factors for user satisfaction. For example, in recommendation systems, factors that may have impact on user satisfaction include recommendation accuracy, diversity and novelty. One way to make learning efficient and fast in RL algorithms is through incorporating prior knowledge and findings from these prior works. In some cases, the operations of this step refer to, or may be performed by, a recommendation apparatus as described with reference to FIG. 1.

At operation 215, the system selects a next media item for the user to interact with based on the constraints. In some embodiments, the system applies a constraint sampling reinforcement learning algorithm which is executed to incorporate prior knowledge as a set of constraints on a policy. A good constraint can increase efficiency of learning by reducing the number of policies that the recommendation system evaluates. As a result, user satisfaction can be increased (e.g., early users in an application domain) through eliminating a set of known bad policies. In the example above, the system predicts a next item to be a Maroon 5 song and retrieves the song from the database. The system selects the Maroon 5 song based on past user interactions (e.g., the set of Taylor Swift songs) and the selected constraints (considering factors including accuracy, novelty, and diversity). The system determines that the user prefers a song that is similar in genre/type to Taylor Swift songs and in the meantime can avoid boredom due to listening to songs from the same singer. In some cases, the operations of this step refer to, or may be performed by, a recommendation apparatus as described with reference to FIG. 1.

At operation 220, the user interacts with the next media item. The user listens to the Maroon 5 song recommended by the system. The next media item becomes a part of the user interaction history (i.e., updated history). The next media item is presented to the user through a user interface on a user device (e.g., a personal computer). The next media item is also stored in the database and can be retrieved. Embodiments of the present disclosure are not limited to audio files, and other types of media may be used such as audio files, video files, image files, and text files. In some cases, the operations of this step refer to, or may be performed by, a user as described with reference to FIG. 1.

Network Architecture

Figure 3:
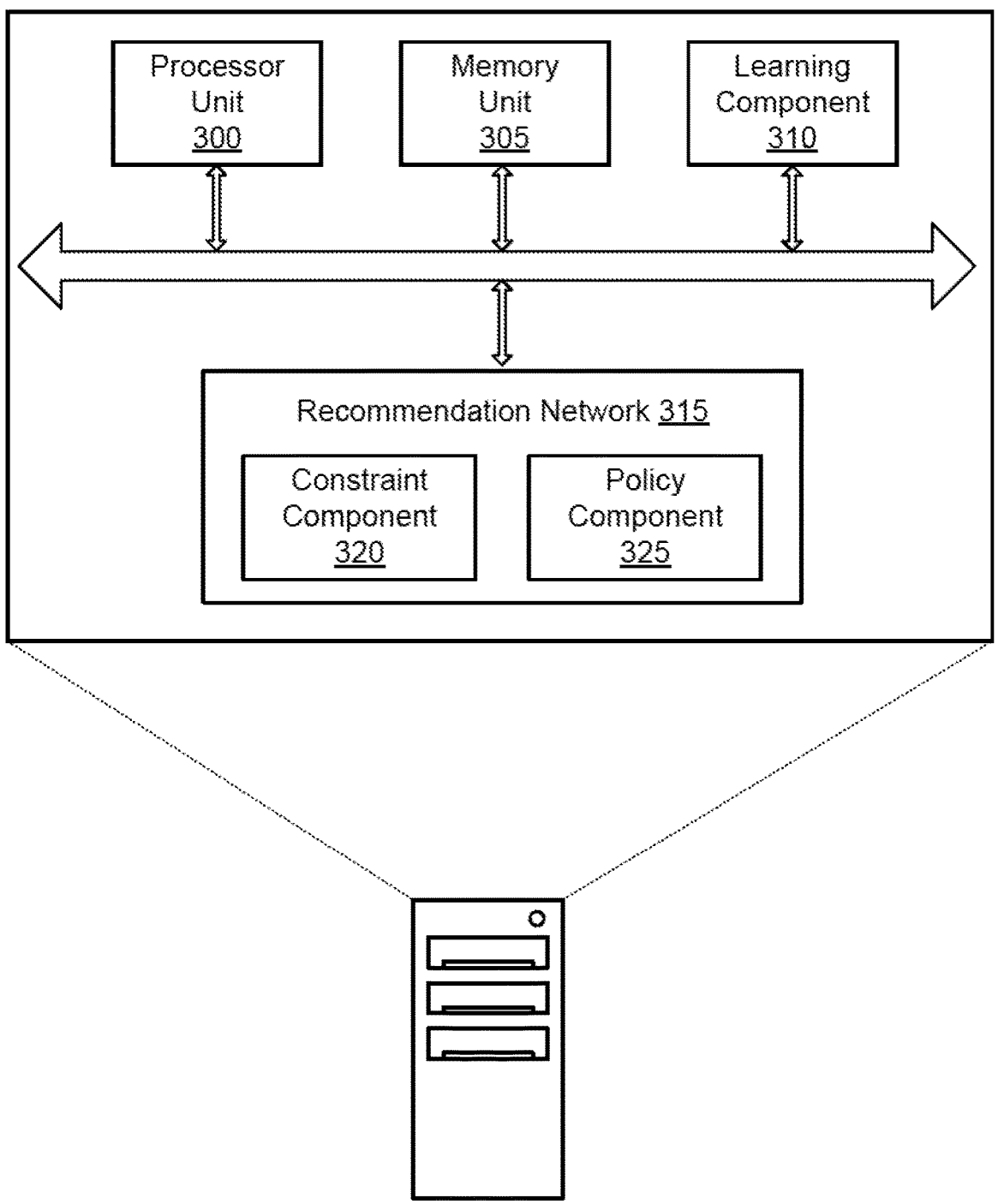
FIG. 3 shows an example of a recommendation apparatus according to aspects of the present disclosure.

FIG. 3 shows an example of a recommendation apparatus according to aspects of the present disclosure. The example shown includes processor unit 300, memory unit 305, learning component 310, and recommendation network 315. Recommendation network 315 is an example of, or includes aspects of, the corresponding element described with reference to FIG. 4.

In one embodiment, recommendation network 315 includes constraint component 320 and policy component 325. According to this embodiment, a constraint component 320 is configured to select a constraint from a plurality of candidate constraints based on lifetime values observed for the candidate constraints, a policy component 325 is configured to predict next items for a user based on a user interaction history, wherein the next items are selected subject to the constraint, and a learning component 310 configured to identify a lifetime value for the user and update parameters of the recommendation network based on the identified lifetime value.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments of the present disclosure, the recommendation network 315 includes a computer implemented artificial neural network (ANN) that generates sequential recommendation. In some embodiments, the recommendation network 315 includes a policy component configured to predict next items for a user. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, learning component 310 measures the lifetime values based on the interactions. In some examples, the recommendation network 315 is trained using an upper confidence reinforcement learning process based on the lifetime values. In some examples, learning component 310 computes an estimated reward based on the next item, where the next item is predicted based on the estimated reward. According to some embodiments, learning component 310 is configured to identify a lifetime value for the user and update parameters of the recommendation network 315 based on the identified lifetime value.

According to some embodiments, learning component 310 identifies a set of candidate constraints based on predictions about user preferences. In some examples, learning component 310 computes lifetime values for the users based on the selected next items. In some examples, learning component 310 updates parameters of the recommendation network 315 based on the lifetime values. In some examples, learning component 310 computes a reward for the next items based on how the users interact with the next items, where the lifetime values are computed based on the reward. In some examples, learning component 310 determines when the users drop out, where the lifetime values are based on the determination. In some examples, learning component 310 computes dropout probabilities for the users, where the next items are selected based on the dropout probabilities. Learning component 310 is an example of, or includes aspects of, the corresponding element described with reference to FIG. 4.

According to some embodiments, recommendation network 315 predicts a next item for the user based on the user interaction history subject to the selected constraint. In some examples, recommendation network 315 predicts a subsequent item for the user based on the updated user interaction history. In some examples, recommendation network 315 predicts the items for each of the other users subject to the selected constraint. In some examples, recommendation network 315 computes a dropout probability, where the next item is predicted based on the dropout probability. According to some embodiments, recommendation network 315 selects next items from the set of candidate items based on the observed interactions.

According to some embodiments, constraint component 320 selects a constraint from a set of candidate constraints based on lifetime values observed for the candidate constraints, where the lifetime values are based on items predicted for other users using a recommendation network 315 subject to the candidate constraints. In some examples, constraint component 320 identifies the set of candidate constraints based on predictions about user preferences. In some examples, constraint component 320 selects one of the candidate constraints for each of the other users. In some examples, constraint component 320 computes an upper confidence bound for each of the candidate constraints based on the lifetime values, where the constraint is selected based on having a highest upper confidence bound among the computed upper confidence bounds.

In some examples, the constraint includes a cost function and a constraint cost limit. In some examples, the constraint includes a prediction diversity constraint configured to ensure that the recommendation network 315 selects diverse items for the user. In some examples, the constraint includes a prediction novelty constraint configured to ensure that the recommendation network 315 selects novel items for the user.

According to some embodiments, constraint component 320 is configured to select a constraint from a set of candidate constraints based on lifetime values observed for the candidate constraints. In some examples, the constraint component 320 is configured to compute an upper confidence bound for each of the candidate constraints based on the lifetime values.

According to some embodiments, constraint component 320 selects a constraint from the set of constraints for each of a set of users. In some examples, constraint component 320 computes an upper confidence bound for each of the candidate constraints based on the lifetime values, where the constraint is selected based on the upper confidence bound.

In some examples, the upper confidence bound decays over time. Constraint component 320 is an example of, or includes aspects of, the corresponding element described with reference to FIG. 4.

According to some embodiments, policy component 325 is configured to predict next items for a user based on a user interaction history, wherein the next items are selected subject to the constraint. Policy component 325 is an example of, or includes aspects of, the corresponding element described with reference to FIG. 4.

A method of providing an apparatus for sequential recommendation is described. The method includes a constraint component configured to select a constraint from a plurality of candidate constraints based on lifetime values observed for the candidate constraints, a policy component configured to predict next items for a user based on a user interaction history, wherein the next items are selected subject to the constraint, and a learning component configured to identify a lifetime value for the user and update parameters of a recommendation network based on the identified lifetime value.

In some examples, the constraint component is configured to compute an upper confidence bound for each of the candidate constraints based on the lifetime values. Some examples of the apparatus and method described above further include a user interface configured to present the next items to the user and to collect the user interaction history.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
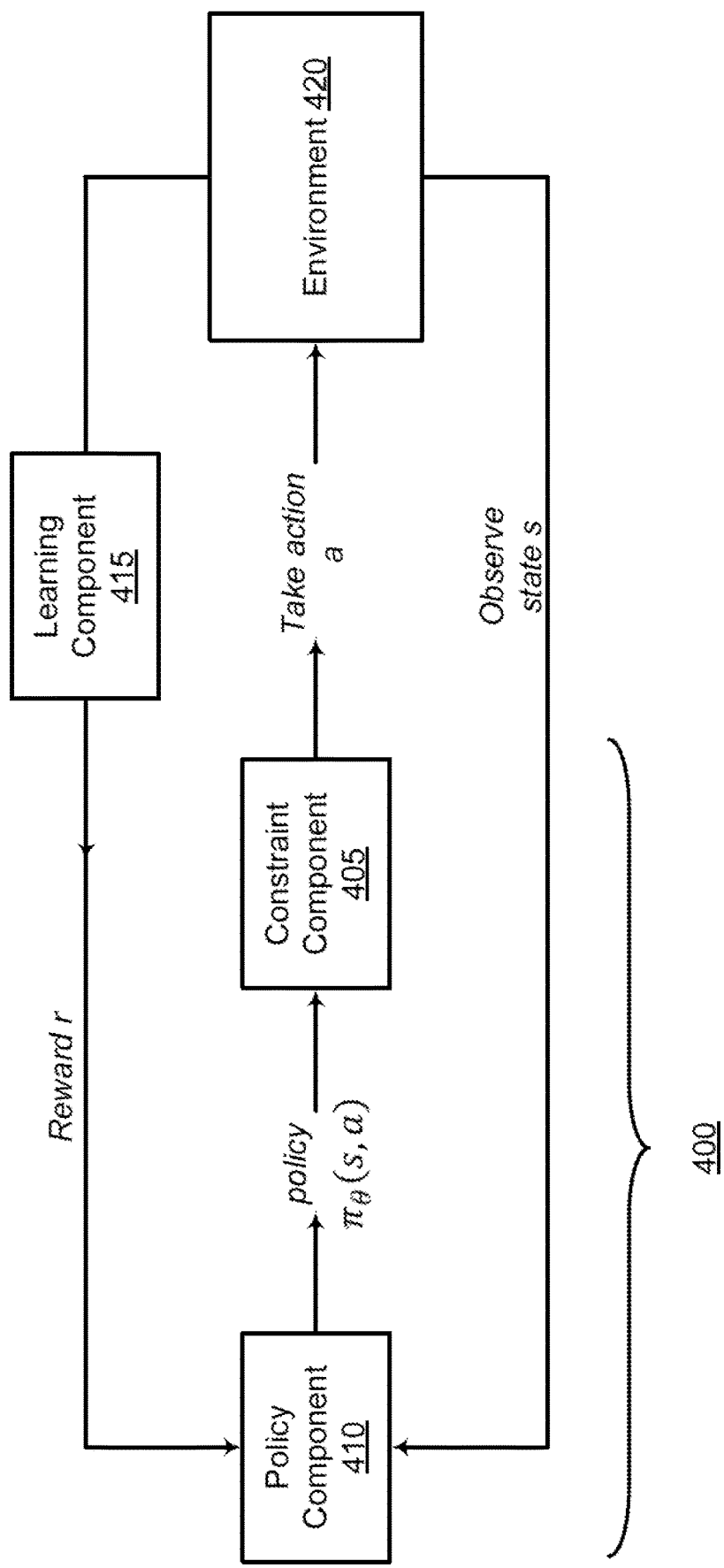
FIG. 4 shows an example of a recommendation network according to aspects of the present disclosure.

FIG. 4 shows an example of a recommendation network 400 according to aspects of the present disclosure. The example shown includes recommendation network 400, learning component 415, and environment 420.

A Markov Decision Process (MDP) is a decision making model used in situations where outcomes are partially under the control of a decision maker (the agent), and partially random (or not controlled by the agent). An MDP is defined by four primary components: a state set, an action set, a transition function, and a reward function. Given these components, a policy function is chosen that selects an action at each time period, based on the state, to maximize the reward. Decisions are made by selecting an action according to the policy function. The selected action causes a state transition which determines the future state (along with other random factors), which in turn impacts future decisions. The state set refers to how the set of possible states representing information that an agent has available to make a decision. The action set refers to the set of actions that are available to an agent at any given time in an MDP. The reward function refers to the function that specifies the relative value of different outcomes. The policy function refers to the function of an MDP that takes the current state as input and outputs an action (or a probability distribution over a set of actions). In other words, the policy function determines what decision the agent should make at any given time. The policy function may be implemented as a complex polynomial or with one or more neural networks. An agent seeks to find the optimal policy function that maximizes the reward function over time.

In an embodiment, a user behavior model is used to evaluate an algorithm for optimizing lifetime value, the metric used herein represents a natural way of optimizing for all factors important for users of a recommendation system. The recommendation system augments a user reward model with a model of dropout validated in the Movielens 100K dataset. The model of dropout is configured to capture the effects of the diversity and novelty factors.

In one embodiment, recommendation network 400 includes constraint component 405 and policy component 410. Recommendation network 400 is an example of, or includes aspects of, the corresponding element described with reference to FIG. 3. In some cases, the recommendation network 400 is also referred to as a recommendation system or a system.

In an embodiment, the recommendation network 400 considers a finite action set. In some examples, a movie recommendation system may define these actions using genres of movies. The recommendation network 400 defines the state at time as the sequence of the last actions. Given a state and action, a recency function is also used to capture how often a user has experienced the action in recent history. The recommendation network 400 assumes there are parameters $\theta^*$ such that a true reward r can be formulated and calculated.

The recommendation network 400 is not limited to maximize infinite horizon average reward. In an embodiment, let f be a deterministic transition function that drops the action taken w timesteps ago and appends the most recent action. The recommendation network 400 formulates a MDP $M=MDP(S, A, f, r)$ and maximize infinite horizon average reward $G(\pi)$ in this MDP. However, recommendation network 400 and system herein are not limited to maximize infinite horizon average reward (i.e., consider the factor of accuracy exclusively). Unlike existing technology, the recommendation network 400 optimizes for average lifetime value which can capture multiple factors.

In some embodiments, the recommendation network 400 is configured to augment the basic reward model with a dropout setting by specifying termination probabilities. The recommendation network 400 includes a variability function as the number of unique actions. The recommendation network 400 uses this metric as a proxy for the factors of diversity and novelty. Increasing variability leads to increase in diversity. It can also increase the factor of novelty as it increases the number of different items a user is exposed to. As a result, the chance that the user will see an item he/she is less familiar with is also increased. Additionally or alternatively, to better compare with baselines that do not account for dropout, the recommendation system augments the basic reward model to depend on variability.

In an embodiment, the recommendation network 400 considers maximizing cumulative episode reward. The finite horizon MDP is defined as M=MDP(S, A, f, r, p). The recommendation network 400 can efficiently find an optimal policy in this MDP.

Policy component 410 is an example of, or includes aspects of, the corresponding element described with reference to FIG. 3. As illustrated in FIG. 4, the policy component 410 generates a policy, which is then input to constraint component 405. One or more embodiments of the present disclosure reduce the number of users who have a poor experience by leveraging prior knowledge or findings from human psychology or HCI work as a set of constraints. The recommendation system includes a constraint by a constraint cost function and a constraint cost limit using constraint component 405. The constraint cost function defines a positive cost for taking action a in state $s_t$. The constraint limit defines a limit on the expected average constraint cost over a trajectory.

In some embodiments, the recommendation system takes as input a set of constraints and the set of constraints are input to constraint component 405. Constraint component 405 generates an action which is then fed into environment 420. In some example experiments, results from a constrained sampling reinforcement learning algorithm used by the recommendation system in the Movielens environment 420 fit to data as well as a simpler toy domain.

For example, in the Movielens environment 420, the system considers a history w of 5, polynomial sizes d=5 and $d_2$=2, and an action set |A|=5. In this domain there are a total of 15,626 state action pairs. The recommendation system uses a constraint set including constraints on minimum variability of the form $c_v(s, a) = \mathbb{1}\{V(s_t, a) < v\}$ as well as the no-constraint function $c_{no-const}(s, a) = 0$. In some examples, the maximum variability is 5, therefore the constraint set is $C=\{c_{no-const}, c_2, \ldots, c_5\}$. In the simplified toy domain, the system considers a history w=3, d=1, $d_2$=1, |A|=4. There are 256 state, action pairs. The maximum variability is 4, therefore the constraint set is $C=\{c_{no-const}, c_2, \ldots, c_4\}$.

In some example experiments, the recommendation system includes constraints with different values of $v_{min}$ along with a trivial no-constraint function. The recommendation system tracks confidence estimates of average total episode reward accumulated when following the constraint. For each new user, the recommendation system optimistically samples a constraint, $c_i(s_t, a)$, by choosing the one with the highest average lifetime value upper confidence bound.

In an embodiment, constraint component 405 of the recommendation system applies a constraint sampling reinforcement learning algorithm (or constraint sampling RL algorithm). The constraint sampling reinforcement learning algorithm is also referred to as an algorithm. The constraint sampling RL algorithm treats the constraints as arms of a bandit and applies an upper confidence bound (UCB) algorithm, which has theoretical convergence guarantees, for the confidence interval estimate. In some cases, rather than performing exploration by simply selecting an arbitrary action, which is chosen with a constant probability, the UCB algorithm may change its exploration-exploitation balance as it gathers more knowledge of the environment 420. The UCB moves from being primarily focused on exploration, to concentrate more on exploitation (e.g., selecting the action with the highest estimated reward). If the constraints in the set are well designed, the algorithm can learn the best constraint to follow on a faster timescale than learning all the model dynamics (reward and dropout), resulting in a reduced number of users who have low lifetime values. Constraint component 405 is an example of, or includes aspects of, the corresponding element described with reference to FIG. 3. Detail regarding the constraint sampling RL algorithm is described below with reference to FIG. 7.

According to some embodiments, learning component 415 measures the lifetime values based on the interactions. In some examples, the recommendation network 400 is trained using an upper confidence reinforcement learning process based on the lifetime values. In some examples, learning component 415 computes an estimated reward based on the next item, where the next item is predicted based on the estimated reward. The learning component generates a reward r, which is then input to the policy component 410.

According to some embodiments, learning component 415 is configured to identify a lifetime value for the user and update parameters of the recommendation network 400 based on the identified lifetime value. Learning component 415 is an example of, or includes aspects of, the corresponding element described with reference to FIG. 3.

Figure 5:
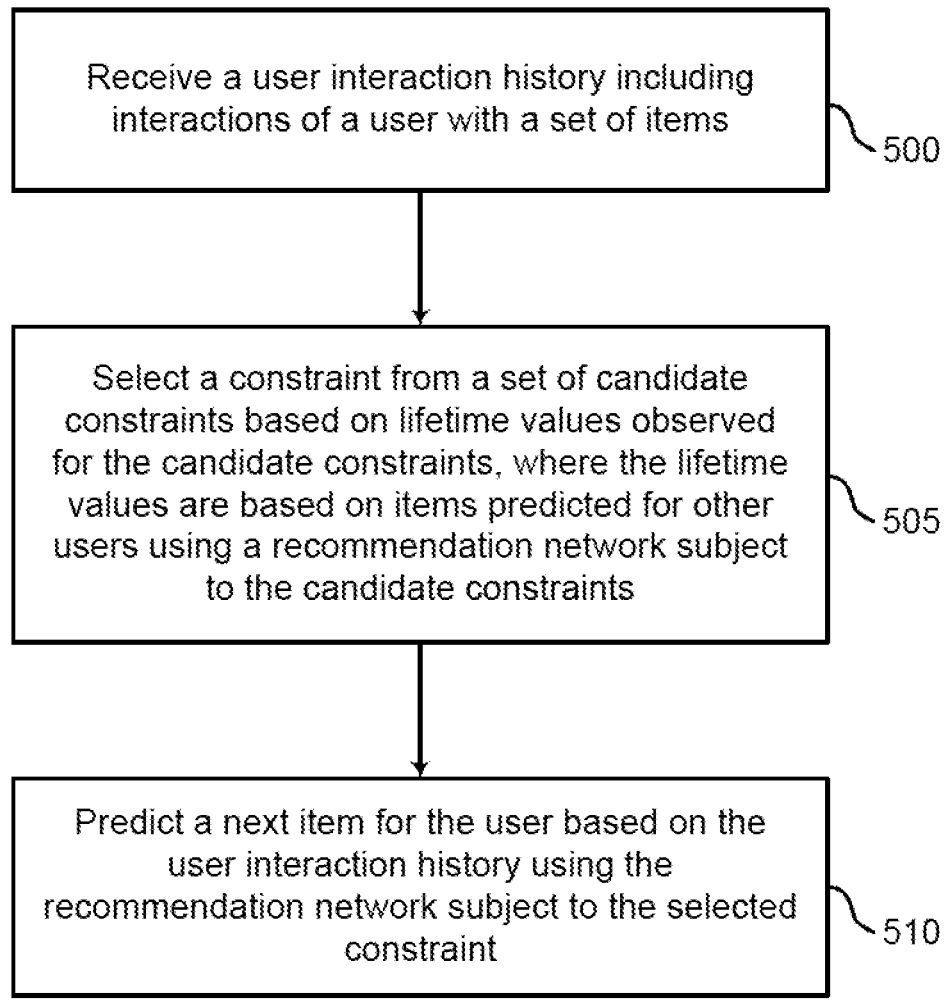
FIGS. 5 and 6 show examples of a process for sequential recommendation according to aspects of the present disclosure.

FIG. 5 shows an example of a process for sequential recommendation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for sequential recommendation is described. Embodiments of the method are configured to receive a user interaction history including interactions of a user with a plurality of items, select a constraint from a plurality of candidate constraints based on lifetime values observed for the candidate constraints, wherein the lifetime values are based on items predicted for other users using a recommendation network subject to the candidate constraints, and predict a next item for the user based on the user interaction history using the recommendation network subject to the selected constraint.

At operation 500, the system receives a user interaction history including interactions of a user with a set of items. In some cases, the operations of this step refer to, or may be performed by, a user interface implemented on a user device as described with reference to FIG. 1.

In some embodiments, the system receives at least one episode associated with a user. An episode is a session, or a collection of virtual events, measured in the time domain from the beginning when a user joins to the end when the user leaves the session. For example, the user joining to play a video game is considered the beginning of an episode. After the user is inactive for a certain period of time, it is considered the end of the episode for that user. In some examples, an episode reaches its end when the user unsubscribes from the gaming service (e.g., unsubscribes from users list and updates or actively uninstalls a game).

In an embodiment, the system applies an algorithm for optimizing lifetime value, and metric optimizing for all factors important for users of a recommendation system. The recommendation system augments a user reward model with a dropout model validated in datasets (e.g., Movielens 100K dataset). The dropout model is configured to capture the effects of diversity and novelty factors.

At operation 505, the system selects a constraint from a set of candidate constraints based on lifetime values observed for the candidate constraints, where the lifetime values are based on items predicted for other users using a recommendation network subject to the candidate constraints. In some cases, the operations of this step refer to, or may be performed by, a constraint component as described with reference to FIGS. 3 and 4.

In an embodiment, the recommendation system considers a finite action set A. In some examples, one way to define actions in a movie recommendation system can be genres of movies. The recommendation system defines the state at time t, $s_t$, as the sequence of the last w actions. The state at time t is formulated as follows:

$$s_t = (a_{t-1}, \ldots a_{t-w}) \tag{1}$$

Given a state and action, a recency function is defined as follows:

$$\rho(s_t, a) = \sum_{\tau=1}^{w} \frac{\mathbb{1}\{a_{t-\tau} = a\}}{\tau} \tag{2}$$

where $\rho(s_t, a)$ captures how often a user has experienced the action in recent history. The less frequently a user at time t has interacted with action a in the last w movies, the lower $\rho(s_t, a)$. When action a is taken in state $s_t$, the system assumes the observed reward is generated by a degree d polynomial of $\rho$. In some cases, the system defines the following:

$$x_{s,a} = [1, \rho(s_t, a), \ldots, \rho(s_t, a)^d] \in \mathbb{R}^{d+1} \tag{3}$$

The system assumes there are parameters $\theta^*$ such that the true reward r is defined by the following:

$$r(s_t, a) = \Sigma_{j=0}^{d} \theta_{a,j}^* \rho(s_t, a)^j = x_{s,a}^T \theta_a^* \tag{4}$$

In an embodiment, a basic reward model above is configured to maximize infinite horizon average reward. The basic reward model above is limited to consider factor of accuracy exclusively. Formally, let f be a deterministic transition function that drops the action taken w timesteps ago and appends the most recent action. This embodiment provides a MDP M=MDP(S, A, f, r) and maximize infinite horizon average reward $G(\pi)$ in this MDP:

$$G(\pi) = \lim_{n \to \infty} \mathbb{E}_\pi \left[ \frac{1}{n} \sum_{t=1}^{n} r_t \right] \tag{5}$$

Unlike existing technology, in one or more embodiments, the recommendation system optimizes for average lifetime value which can capture multiple factors beyond the infinite horizon average reward.

In some embodiments, the system augments the basic reward model with a dropout model by specifying termination probabilities. The recommendation system includes a variability function, $V(s_t, a)$, as the number of unique actions in the union of $s_t$ and a (recall that $s_t$ is the sequence of the last w actions). The variability function, $V(s_t, a)$ is formulated as below:

$$V(s_t, a) = \Sigma_{a' \in A} \mathbb{1}\{a' \in (s_t \cup a)\} \tag{6}$$

The recommendation system uses this metric as a proxy for the factors of diversity and novelty. Increasing variability leads to increase in diversity factor. It may also increase novelty factor as it increases the number of different items the user can see, increasing the chance a user will see an item he/she is less familiar with. Let $\mathcal{V}$ be the set of all possible values $V(s_t, a)$ can take on. $\mathcal{V}$ is finite and has bounded size such that $|\mathcal{V}| < \min(w+1, |A|)$. The recommendation system models the dropout (termination) probability as a function of variability. It is assumed that each value $v \in |\mathcal{V}|$ corresponds to a probability of dropout $p_v$. In some examples, the recommendation system models the probability of dropout of taking action a in state $s_t$ to be the probability of dropout of $V(s_t, a)$ as follows:

$$p(s_t, a) = p_{V(s_t, a)} \tag{7}$$

Additionally, to better compare with baselines that do not account for dropout, the recommendation system augments the reward model to depend on variability as well. It is assumed that reward, in addition to a degree d polynomial function of recency, is also a degree $d_2$ polynomial of both variability and a cross-term of variability and recency. Formally, $x_{s,a} \in \mathbb{R}^{d+2d_2}$ is defined as:

$$x_{s,a} = [1, \rho(s_t, a), \ldots \rho(s_t, a)^d, v(s_t, a), (v(s_t)\rho(s_t, a)), \ldots, v(s_t, a)^{d_2}, (v(s_t)\rho(s_t, a))^{d_2}] \tag{8}$$

The recommendation system assumes that there are values of $\theta_a^*$ such that the true reward is $r(s_t, a) = x_{s,a}^T \theta_a^*$.

In an embodiment, the recommendation system considers maximizing cumulative episode reward. The finite horizon MDP is defined as M=MDP(S, A, f, r, p). The system can efficiently find the optimal policy in this MDP:

$$\pi^* = \arg\max_\pi G(\pi) = \arg\max_\pi \mathbb{E}_\pi \left[ \sum_{t=0}^{T} r_t \mid s_0 \right] \tag{9}$$

where T is the length of episode and is also a random variable. Additionally, in one embodiment, the recommendation system defines an equivalent MDP by augmenting the state space with a terminal state and defining a transition function that combines f and p. The given notations are adopted to distinguish between the deterministic transition function f that is known and the stochastic termination probabilities p that need to be estimated.

At operation 510, the system predicts a next item for the user based on the user interaction history using the recommendation network subject to the selected constraint. In some cases, the operations of this step refer to, or may be performed by, a recommendation network as described with reference to FIGS. 3 and 4.

An apparatus for sequential recommendation is described. The apparatus includes a processor, memory in electronic communication with the processor, and instructions stored in the memory. The instructions are operable to cause the processor to receive a user interaction history including interactions of a user with a plurality of items, select a constraint from a plurality of candidate constraints based on lifetime values observed for the candidate constraints, wherein the lifetime values are based on items predicted for other users using a recommendation network subject to the candidate constraints, and predict a next item for the user based on the user interaction history using the recommendation network subject to the selected constraint.

A non-transitory computer readable medium storing code for sequential recommendation is described. In some examples, the code comprises instructions executable by a processor to receive a user interaction history including interactions of a user with a plurality of items, select a constraint from a plurality of candidate constraints based on lifetime values observed for the candidate constraints, wherein the lifetime values are based on items predicted for other users using a recommendation network subject to the candidate constraints, and predict a next item for the user based on the user interaction history using the recommendation network subject to the selected constraint.

Some examples of the method, apparatus, and non-transitory computer readable medium described above further include presenting the next item to the user. Some examples further include updating the user interaction history based on a response of the user to the next item. Some examples further include predicting a subsequent item for the user based on the updated user interaction history.

Some examples of the method, apparatus, and non-transitory computer readable medium described above further include identifying the plurality of candidate constraints based on predictions about user preferences.

Some examples of the method, apparatus, and non-transitory computer readable medium described above further include selecting one of the candidate constraints for each of the other users. Some examples further include predicting the items for each of the other users using the recommendation network subject to the selected constraint. Some examples further include observing interactions of the other users with the items. Some examples further include measuring the lifetime values based on the interactions.

Some examples of the method, apparatus, and non-transitory computer readable medium described above further include computing an upper confidence bound for each of the candidate constraints based on the lifetime values, wherein the constraint is selected based on having a highest upper confidence bound among the computed upper confidence bounds.

In some examples, the constraint comprises a cost function and a constraint cost limit. In some examples, the constraint comprises a prediction diversity constraint configured to ensure that the recommendation network selects diverse items for the user. In some examples, the constraint comprises a prediction novelty constraint configured to ensure that the recommendation network selects novel items for the user. In some examples, the recommendation network is trained using an upper confidence reinforcement learning process based on the lifetime values.

Some examples of the method, apparatus, and non-transitory computer readable medium described above further include computing an estimated reward based on the next item, wherein the next item is predicted based at least in part on the estimated reward.

Some examples of the method, apparatus, and non-transitory computer readable medium described above further include computing a dropout probability, wherein the next item is predicted based at least in part on the dropout probability.

Figure 6:
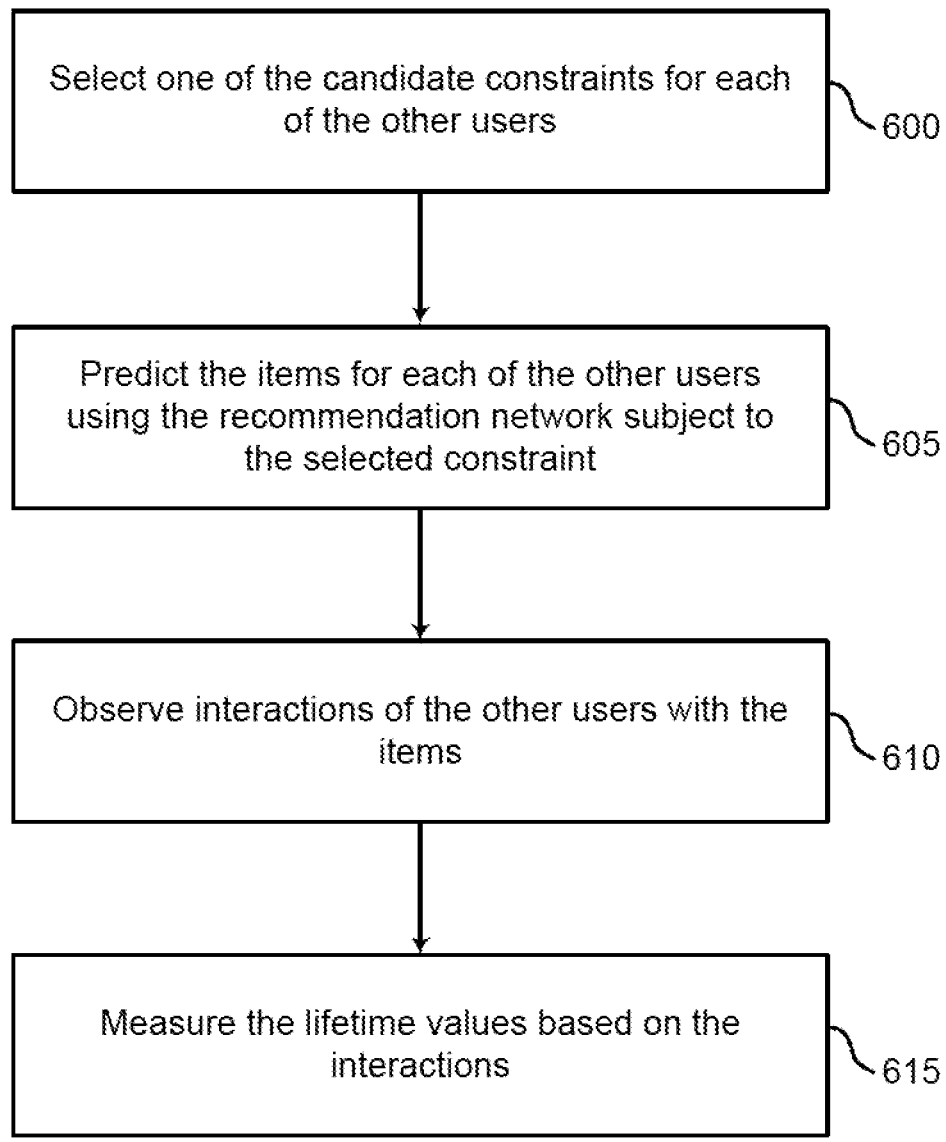

FIG. 6 shows an example of a process for sequential recommendation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system selects one of the candidate constraints for each of the other users. In some cases, the operations of this step refer to, or may be performed by, a constraint component as described with reference to FIGS. 3 and 4.

At operation 605, the system predicts the items for each of the other users using the recommendation network subject to the selected constraint. In some cases, the operations of this step refer to, or may be performed by, a recommendation network as described with reference to FIGS. 3 and 4.

In some embodiments, the system applies prior knowledge and findings about human psychology to efficiently learn to maximize cumulative episode reward. The system uses optimistic model-based constrained reinforcement learning (RL) algorithm. In some cases, a UCRL based algorithm is used to learn model parameters. UCRL is a model based algorithm that estimates confidence intervals for rewards and transition probabilities given the current observations. These estimates define a set of plausible MDPs $\mathcal{M}_t$ given the observations up to time t. The algorithm depends on principal of optimism for the exploration-exploitation tradeoff and the rate of convergence has been proven. At time t, the algorithm executes the optimal policy $\tilde{\pi}_t$ of the most optimistic MDP $\tilde{M}_t \in \mathcal{M}_t$, where $\tilde{M}_t$ has the highest achievable average reward. In one example, the system applies a confidence interval estimation method to estimate the rewards. In one example, the algorithm may be configured to focus exclusively on reward estimation. The algorithm leverages linear structure of the reward model to efficiently construct the confidence intervals.

When using online RL algorithms (e.g., UCRL), learning a good policy takes a large number of episodes. This also means the learning process may involve a large number of users. One or more embodiments of the present disclosure reduce the number of users who have a poor experience by leveraging prior knowledge or findings of human psychology or HCI work as a set of constraints. The recommendation system includes a constraint by a constraint cost function $c(s_t, a)$, and a constraint cost limit d. The constraint cost function $C: S \times A \rightarrow \mathbb{R}^+$ defines a positive cost for taking action a in state $s_t$. The constraint limit d defines a limit on the expected average constraint cost over a trajectory such that the relation $C(\pi)$ should be satisfied. The relation $C(\pi)$ is formulated as follows:

$$C(\pi) = \mathbb{E}_\pi \left[ \frac{\sum_{t=0}^{T} c(s_t, a)}{T} \middle| s_0 \right] < d \tag{10}$$

In some example experiments, the recommendation system considers constraints on various values of minimum variability. Let $v_{min}$ value of minimum variability used in a constraint, the system uses a binary constraint cost that returns 1 if the constraint is violated and 0 otherwise. In some cases, the constraint is never to be violated (i.e., d=0). An example constraint cost function is formulated as:

$$c(s_t, a) = \mathbb{1}\{v(s_t, a) < v_{min}\} \quad (11)$$

In some embodiments, the recommendation system takes as input a set of constraints. The recommendation system includes constraints with different values of $v_{min}$ along with a trivial no-constraint function. The recommendation system tracks confidence estimates of average total episode reward accumulated when following the constraint. For each new user, the method optimistically samples a constraint, $c_i(s_t, a)$, by choosing the one with the highest average lifetime value upper confidence bound. In an embodiment, the algorithm treats the constraints as arms of a bandit and uses the upper confidence bound (UCB) algorithm, which has theoretical convergence guarantees, for the confidence interval estimate. If the constraints in the set are well designed, the algorithm can learn the best constraint to follow on a faster timescale than learning all the model dynamics (reward and dropout), resulting in a reduced number of users who have low lifetime values.

At operation 610, the system observes interactions of the other users with the items. In some cases, the operations of this step refer to, or may be performed by, a user interface implemented on a user device as described with reference to FIG. 1.

At operation 615, the system measures the lifetime values based on the interactions. In some cases, the operations of this step refer to, or may be performed by, a learning component as described with reference to FIGS. 3 and 4.

One or more embodiments of the present disclosure provide an online reinforcement learning algorithm that can optimize for lifetime value by leveraging prior knowledge or findings. In an embodiment, the recommendation system includes validating a user behavior model of dropout and reward. In some embodiments, an optimism based reinforcement learning algorithm is provided that learns efficiently using constraints. The RL algorithm takes as input a set of constraints an algorithm designer hypothesizes could be helpful, informed by existing knowledge and/or findings. The system tracks confidence intervals over constraints and model parameters to find a policy for a user by solving an optimistic constrained MDP. If there are good constraints in the set, the recommendation system can locate a good constraint to follow at a faster timescale than learning all the model parameters, resulting in faster learning.

FIG. 7 shows an example of a constraint sampling reinforcement learning algorithm 700 according to aspects of the present disclosure. The constraint sampling reinforcement learning algorithm 700 is also referred to as a constraint sampling RL algorithm or an algorithm.

According to an embodiment, at line 1, algorithm 700 takes as input including a set of constraints $\mathcal{C}$. At line 2, algorithm 700 initializes t=0, $L_i$=[ ] $\forall i \in |\mathcal{C}|$, reward and dropout parameters. At line 3, for each of Users h=1, 2, 3 ..., the algorithm 700 would execute lines 4 to 18. At line 4, algorithm 700 calculates and sets optimistic constraint estimates to $$\tilde{\mathcal{J}}(c_i) = \frac{\Sigma_{l_j \in L_{c_i}} l_j}{(\max L_{c_i})|L_{c_i}|} + u_{c_i} \quad \forall i \in |\mathcal{C}|.$$

At line 5, algorithm 700 chooses constraint index i←argmax$_i$ J($c_i$). At line 6, algorithm 700 sets constraint for user as the $i^{th}$ constraint in the set $c_h \leftarrow \mathcal{C}[i]$. At line 7, algorithm 700 sets $l_h$=0 and $l_h$ tracks the lifetime value for user h. At line 8, if $c_h \neq c_{h-1}$ is satisfied, then algorithm 700 would execute line 9. At line 9, algorithm 700 compute policy $\tilde{\pi}_h$ for constrained MDP(S, A, f, $\tilde{r}_t$, $\tilde{p}_t$, $c_h$). At line 10, while a condition is met (i.e., user h not dropped out), algorithm 700 would execute lines 11 to 17. At line 11, algorithm 700 chooses action $a_t \sim \tilde{\pi}_h$. At line 12, algorithm 700 observes reward $r_t$, dropout status $d_t$ and next stage $s_{t+1}$. At line 13, algorithm 700 executes $l_h \leftarrow l_h + r_t$; At line 14, if Update Criteria Met, then algorithm 700 would execute lines 16 and 17. At line 16, algorithm 700 updates $\tilde{r}_t$ and $\tilde{p}_t$ using UCRL based method. At line 17, algorithm 700 computes policy $\tilde{\pi}_h$ for CMDP(S, A, f, $\tilde{r}_t$, $\tilde{p}_t$, $c_h$). At line 18, algorithm 700 sets $L_{c_h} \leftarrow [L_{c_h}, l_h]$.

The constraint sampling RL algorithm 700 calculates confidence intervals over constraints and constrained MDP. In an embodiment, the algorithm uses UCB based confidence interval to track an estimate of cumulative episode reward for each constraint. The value of the confidence interval width of the $i^{th}$ constraint is set as follows:

$$u_{c_i} = \sqrt{\frac{2\log(h)}{|L_{c_i}|}} \quad (12)$$

where h in the number of users so far and $L_{c_i}$ is a set of the lifetime values observed every time $c_i$ is used. For the $h^{th}$ user, the constraint with the highest upper confidence bound is chosen.

In some embodiments, the recommendation system computes a policy for the constrained optimistic MDP by solving the following objective:

$$\tilde{\pi}_h = \underset{\pi}{\operatorname{argmax}}\{G(\pi) \mid C_h(\pi) = 0\} \quad (13)$$

where $C_h$ is the expected average lifetime constraint cost from following constraint $c_h$ and $G(\pi) = \mathbb{E}_\pi[\Sigma_{t=0}^T r_t | s_0]$. In some cases, the constraint should never be violated so the recommendation system can approximately solve the constrained MDP using value iteration with a large negative dual penalty for state action pairs that violate the constraint.

The algorithm 700 is executed to estimate and update model parameters. A modified UCRL algorithm is used to estimate confidence intervals for model parameters (the reward values $r_t$ and dropout probabilities $p_t$). In some examples, the algorithm 700 is configured to focus exclusively on reward estimation, to estimate confidence intervals for the rewards.

The algorithm 700 is executed to perform dropout probability confidence interval estimation. Let $N_t(s, a)$ be the total number of times the system has observed state action pair (s, a) so far and let $D_t(s, a)$ be the number of times the system has observed termination in (s, a). Following UCRL, the algorithm 700 estimates the average dropout probability to be $$\hat{p}_t(s, a) = \frac{D_t(s, a)}{N_t(s, a)}.$$

The confidence interval over the dropout probability for (s, a) is the set:

$$\mathcal{P}_t(s,a) = \{p(s,a) | \|p(s,a) - \hat{p}_t(s,a)\|_1 \leq c_{p,t}\} \quad (14)$$

where $$c_{p,t} = \sqrt{\frac{14\log\left(\frac{2|A|t}{\delta}\right)}{\max\{1, N_t(s,a)\}}}$$

and δ denotes the confidence parameter controlling the desired certainty the true value is within the set. The algorithm 700 makes no assumptions on the structure of dropout and the algorithm 700 estimates a value for every state action pair.

The algorithm 700 is executed to perform reward confidence interval estimation. To estimate confidence intervals for the rewards, the recommendation system applies a UCRL based algorithm for estimating reward parameters efficiently if they follow a linear structure. The algorithm 700 assumes the true reward structure is known and follows the linear model. The algorithm 700 then utilizes such a linear structure to efficiently construct confidence intervals by estimating θ*. Let vector $R_{a,t}$ hold all the rewards obtained so far when action a was taken and let matrix $X_{a,t}$ hold all the contexts vectors $x_{s_t,a}$ observed when action a was taken. An estimate of $\hat{\theta}_{t,a}$ using the observed data can be found using least squares:

$$\hat{\theta}_{t,a} = \min_{\theta} \sum_{\tau < t: a_\tau = a} \left(x_{s_\tau,a}^T \theta - r_\tau\right)^2 + \lambda \|\theta\|_2 \quad (15)$$

This can be computed in closed form as $\hat{\theta}_{t,a} = V_{t_a}^{-1} X_{t,a}^T R_{t,a}$, where $V_{t,a} = X_{t,a}^T X_{t,a} + \lambda I$.

The estimated average reward function is $\hat{r}_t(s,a) = x_{s,a}^T \hat{\theta}_{t,a}$. The confidence interval over reward for (s, a) is the set as follows:

$$\mathcal{R}_t(s,a) = \{r(s,a) | \|r(s,a) - \hat{r}_t(s,a)\|_1 \leq c_{t,a}\} \quad (16)$$

where $c_{t,a} = (R\sqrt{(d+1)\log(|A|t^a(1+(T_{t,a}L_w^2)/\lambda))} + \lambda^{1/2}B)\|x_{s,a}\|_{V_{t,a}^{-1}}$, B and R are known constants such that $\|\theta_a^*\|_2 \leq B \; \forall a \in A$ and noise is sub-Gaussian with $L_w^2 =$ $$L_w^2 = \frac{1-(\log(w)+1)^{d+1}}{1-(\log(w)+1)},$$

and $T_{t,a}$ is the total number of times at time t action a has been. It has been proven bounds on regret using this confidence interval when considering the infinite horizon average reward objective.

The algorithm 700 then is executed to search for an optimistic MDP. At time t, the confidence intervals over dropout probabilities and rewards define a set of plausible MDPs $\mathcal{M}_t$. In some embodiments, UCRL algorithm finds the most optimistic MDP $M_t \in \mathcal{M}_t$ defined as the MDP that allows for the highest achievable average reward. The reward parameters of the optimistic MDP are the highest rewards in the confidence set:

$$\tilde{r}_t(s,a) = \hat{r}_t(s,a) + c_{t,a} \quad (17)$$

In some embodiments, the dropout probabilities of the optimistic MDP are the lowest value in the confidence set formulated as follows:

$$\tilde{p}_t(s,a) = \max\{\hat{p}_t(s,a) - c_{b,t}, p_{min}\} \quad (18)$$

where $p_{min}$ is a hyperparameter for the minimum dropout probability. The recommendation system estimates the probability of dropping out and transitioning to a terminal state that has a value of zero when all other states have positive values.

The algorithm 700 is executed to determine if update criteria are met. The update criteria of the reward model are when the number of samples collected for an action since the last update is doubled with respect to the total number of samples collected for the action up to the last update. The update criteria of the dropout probability model are when the number of samples collected for any (s, a) since the last update is doubled with respect to the total number of samples collected for (s, a) up to the last update. In an embodiment, the recommendation system updates the model when either one of the update criteria is met.

Training and Evaluation

Figure 8:
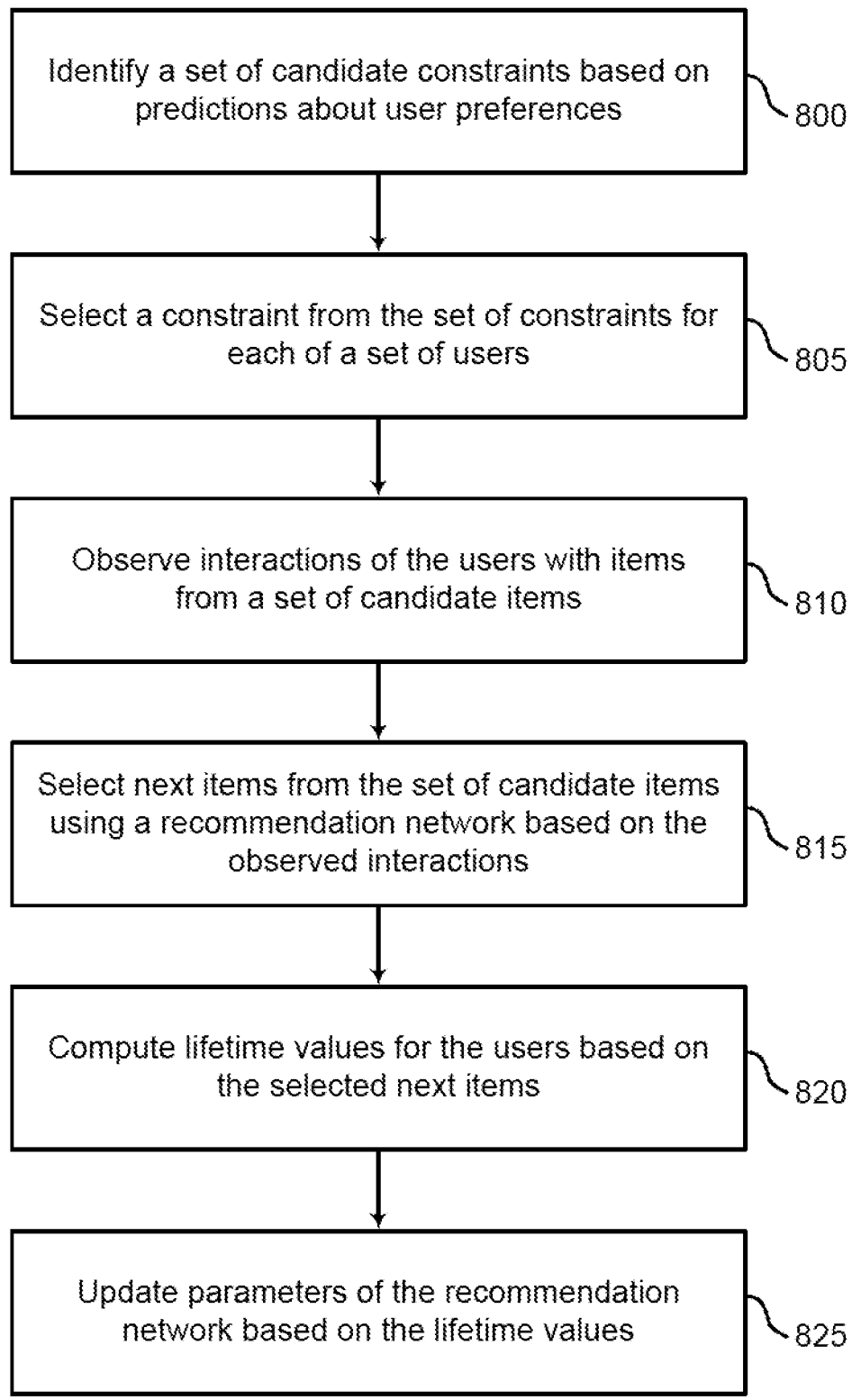
FIG. 8 shows an example of a process for training a recommendation network according to aspects of the present disclosure.

FIG. 8 shows an example of a process for training a recommendation network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a recommendation network is described. Embodiments of the method are configured to identify a plurality of candidate constraints based on predictions about user preferences, select a constraint from the plurality of constraints for each of a plurality of users, observe interactions of the users with items from a set of candidate items, select next items from the set of candidate items using a recommendation network based on the observed interactions, compute lifetime values for the users based at least in part on the selected next items, and update parameters of the recommendation network based on the lifetime values.

Accordingly, the parameters and weights of a recommendation apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are mode during the next iteration.

Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

At operation 800, the system identifies a set of candidate constraints based on predictions about user preferences. In some cases, the operations of this step refer to, or may be performed by, a learning component as described with reference to FIGS. 3 and 4.

In some embodiments, a constraint sampling reinforcement learning method is used to incorporate prior knowledge or findings about human psychology as constraints on the policy. A good constraint increases efficiency of learning a policy by reducing the number of policies a recommendation system needs to evaluate. User satisfaction is increased (e.g., early users during the learning) through eliminating a set of known bad policies.

In some examples, diversity is an important factor in recommendation systems. If the exact best level of diversity is known, a constraint that filters or selects a policy to achieve at least that amount can eliminate policies with suboptimal diversity. In some cases, deriving a single best constraint from a large body of prior findings or conclusions is challenging. This is because every environment is different and there is uncertainty over how well a given prior finding may generalize to different environments or tasks. Therefore, the system takes as input a set of constraints that the algorithm designer hypothesizes could do well, but the algorithm designer does not need to be certain they would do well. For example, an algorithm designer who knows diversity is important may not know the exact level of diversity to use in a constraint, but they can create a set including constraints of varying levels of diversity along with the no-constraint constraint to represent their uncertainty.

At operation 805, the system selects a constraint from the set of constraints for each of a set of users. In some cases, the operations of this step refer to, or may be performed by, a constraint component as described with reference to FIGS. 3 and 4.

In an embodiment, the optimism based algorithm takes as input such a set of constraints. The model based algorithm (e.g., UCRL) is used to estimate model dynamics and track a set of plausible Markov decision processes (MDPs). Additionally, the recommendation system estimates confidence intervals over expected total episode reward for each constraint in the set. At the beginning of each episode, the system optimistically chooses the constraint with the highest upper confidence bound and the MDP in a plausible MDP set that allows for the highest expected values. The system is configured to derive a policy from this optimistic constrained MDP. If one or more constraints in the set are determined useful and important, the system can identify and incorporate them leading to a faster timescale than learning all the model parameters. As a result, learning speed and efficiency is increased.

At operation 810, the system observes interactions of the users with items from a set of candidate items. In some cases, the operations of this step refer to, or may be performed by, a user interface on a user device as described with reference to FIG. 1.

At operation 815, the system selects next items from the set of candidate items using a recommendation network based on the observed interactions. In some cases, the operations of this step refer to, or may be performed by, a recommendation network as described with reference to FIGS. 3 and 4.

In some embodiments, the system is related to e-commerce and media recommendation systems (e.g., movie recommendations). Accuracy, diversity, and novelty are all important aspects of e-commerce and media recommendation systems and are used to determine or increase user satisfaction and user adoption of the system. Existing technology is limited to optimize for accuracy, or correctly predicting items that have high reward, such as items users will rate the highest or click on with the highest probability. For example, in a movie recommendation system, one common reward used is the ratings of the suggested movies. However, one or more embodiments of the present disclosure are configured to optimize for accuracy, diversity and novelty at the same time, which further increase user satisfaction. Additionally, the system considers the multi-timestep effect of a recommendation.

At operation 820, the system computes lifetime values for the users based on the selected next items. In some cases, the operations of this step refer to, or may be performed by, a learning component as described with reference to FIGS. 3 and 4.

In some embodiments, the recommendation system optimizes for all the factors (e.g., novelty, accuracy, and diversity) jointly to compute a lifetime value, or a total amount of reward a user accumulates before leaving the system. In some examples, the system includes an online media recommendation system (e.g., YouTube® Music, Steam® gaming). The system is configured to optimize for lifetime value to trade-off between suggesting high reward (i.e., focus on accuracy factor) items, and the other factors such as diversity and novelty. These other factors, if not satisfied, may lead users to prematurely leave a system (e.g., stop playing an online game), but may suggest lower reward items to satisfy. To evaluate an algorithm that optimizes for lifetime value in simulation depends on a simulated user behavior model for both reward and dropout. One embodiment provides a model of user behavior validated on a real world dataset, the Movielens 100K dataset, by augmenting a basic reward model with a dropout model which depends on a proxy metric for diversity and novelty.

At operation 825, the system updates parameters of the recommendation network based on the lifetime values. In some cases, the operations of this step refer to, or may be performed by, a learning component as described with reference to FIGS. 3 and 4.

An apparatus for training a recommendation network is described. The apparatus includes a processor, memory in electronic communication with the processor, and instructions stored in the memory. The instructions are operable to cause the processor to identify a plurality of candidate constraints based on predictions about user preferences, select a constraint from the plurality of constraints for each of a plurality of users, observe interactions of the users with items from a set of candidate items, select next items from the set of candidate items using a recommendation network based on the observed interactions, compute lifetime values for the users based at least in part on the selected next items, and update parameters of the recommendation network based on the lifetime values.

A non-transitory computer readable medium storing code for training a recommendation network is described. In some examples, the code comprises instructions executable by a processor to identify a plurality of candidate constraints based on predictions about user preferences, select a constraint from the plurality of constraints for each of a plurality of users, observe interactions of the users with items from a set of candidate items, select next items from the set of candidate items using a recommendation network based on the observed interactions, compute lifetime values for the users based at least in part on the selected next items, and update parameters of the recommendation network based on the lifetime values.

Some examples of the method, apparatus, and non-transitory computer readable medium described above further include computing an upper confidence bound for each of the candidate constraints based on the lifetime values, wherein the constraint is selected based on the upper confidence bound. In some examples, the upper confidence bound decays over time.

Some examples of the method, apparatus, and non-transitory computer readable medium described above further include computing a reward for the next items based on how the users interact with the next items, wherein the lifetime values are computed based on the reward.

Some examples of the method, apparatus, and non-transitory computer readable medium described above further include determining when the users drop out, wherein the lifetime values are based at least in part on the determination.

Some examples of the method, apparatus, and non-transitory computer readable medium described above further include computing dropout probabilities for the users, wherein the next items are selected based at least in part on the dropout probabilities.

Performance of apparatus and methods of the present disclosure have been evaluated, and results indicate embodiments of the present disclosure provide an improvement over existing technology. A constraint sampling RL algorithm and methods of the present disclosure are compared to following baselines (e.g., unconstrainted, singly constrained, LinUCRL baseline) and oracle. LinUCRL is a modified UCRL based algorithm. In some examples, the oracle knows the true model parameters and solves for the optimal policy. The unconstrained baseline has no notion of constraints and uses the estimates of the reward and dropout parameters to solve an optimistic unconstrained MDP. The singly constrained baseline follows a single helpful constraint, but is not the best one in the constraint set. The LinUCRL baseline has no notion of dropout and directly runs the algorithm for maximizing infinite horizon average reward.

Results of experiments in the Movielens environment are recorded. The evaluation include results from the Movielens environment and results from a simplified Toy environment. Due to a good constraint in the set, constraint sampling methods and systems of the present disclosure perform better than baselines. The constraint sampling method can learn much faster than baselines. This is because the recommendation system includes a good constraint in the constraint set, the minimum variability 5 constraint. Constraint sampling is able to quickly identify and apply the constraint. Following a single helpful constraint performs better than the unconstrained baseline. Due to the large state and action space, the dropout parameters in the Movielens environment take an especially long time to learn. To better compare the magnitude of samples needed for convergence of constraint sampling and baselines. Constraint sampling method learns 10-20 times faster than baselines. Additionally, the no-dropout baselines in both environments demonstrate that exclusively optimizing for accuracy factor leads to poor performance.

In some example simulations, the recommendation system can fit parameters $\theta_a^* \forall a \in A$ and $p_v \forall v \in C$ using the Movielens 100K dataset. One example also shows validation for the model of dropout. In some examples, the system considers a history length w of 5. The fitted values of $p_v$ for v=(1, 2, 3, 4, 5) were (0.0133, 0.14, 0.0117, 0.0113, 0.0102) respectively. Dropout probability decreases as variability increases, indicating experiencing a wide variety of movies is an important component for users. Using a chi-squared test of homogeneity, a statistically significant difference emerges in $p_v$, between v=2 and v=5 ($\chi^2$=3.9, p=0.047).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for sequential recommendation, comprising:
   receiving, at a policy component of a recommendation network, a user interaction history including interactions of a user with a plurality of media items, wherein the recommendation network comprises a reinforcement learning model;
   selecting, using a constraint component of the recommendation network, at least one constraint of a plurality of candidate constraints for each of a plurality of other users;
   predicting a media item from the plurality of media items for each of the plurality of other users using the recommendation network subject to the selected at least one constraint;
   observing interactions of each of the other users with the corresponding predicted media item, respectively;
   measuring lifetime values for the plurality of candidate constraints based on the observed interactions;

selecting, using the constraint component of the recommendation network, a constraint from a plurality of candidate constraints based on the lifetime values observed for the candidate constraints, wherein the lifetime values are based on the media items predicted for the other users using the recommendation network subject to the candidate constraints, wherein at least one of the plurality of candidate constraints comprises a minimum variability value for a state-action pair;

predicting, using the recommendation network, a next media item for the user based on the user interaction history and subject to the selected constraint; and presenting the next media item to the user.

2. The method of claim 1, further comprising:
updating the user interaction history based on a response of the user to the next media item; and
predicting a subsequent media item for the user based on the updated user interaction history.

3. The method of claim 1, further comprising:
identifying the plurality of candidate constraints based on predictions about user preferences.

4. The method of claim 1, further comprising:
computing an upper confidence bound for each of the candidate constraints based on the lifetime values, wherein the constraint is selected based on having a highest upper confidence bound among the computed upper confidence bounds.

5. The method of claim 1, wherein:
the constraint comprises a cost function and a constraint cost limit.

6. The method of claim 1, wherein:
the constraint comprises a prediction diversity constraint configured to ensure that the recommendation network selects diverse media items for the user.

7. The method of claim 1, wherein:
the constraint comprises a prediction novelty constraint configured to ensure that the recommendation network selects novel media items for the user.

8. The method of claim 1, wherein:
the recommendation network is trained using an upper confidence reinforcement learning process based on the lifetime values.

9. The method of claim 1, further comprising:
computing an estimated reward based on the next media item, wherein the next media item is predicted based at least in part on the estimated reward.

10. The method of claim 1, further comprising:
computing a dropout probability, wherein the next media item is predicted based at least in part on the dropout probability.

11. An apparatus for sequential recommendation, comprising:
at least one processor;
at least one memory coupled with the at least one processor;
a recommendation network comprising parameters stored in the at least one memory, wherein the recommendation network is configured to:
select, using a constraint component of the recommendation network, at least one constraint of a plurality of candidate constraints for each of a plurality of users;
predict a media item from a plurality of media items for each of the plurality of users using the recommendation network subject to the selected at least one constraint;
observe interactions of each of the other users with the corresponding predicted media item, respectively;
measure lifetime values for the plurality of candidate constraints based on the observed interactions;
select a constraint from the plurality of candidate constraints based on the lifetime values observed for the candidate constraints, wherein at least one of the plurality of candidate constraints comprises a minimum variability value for a state-action pair; and
predict a next media item for a user based on a user interaction history, wherein the next media item is selected subject to the constraint; and
present the next media item to the user;
wherein the apparatus is configured to identify a lifetime value for the user and update parameters of the recommendation network based on the identified lifetime value.

12. The apparatus of claim 11, wherein:
the apparatus is configured to compute an upper confidence bound for each of the candidate constraints based on the lifetime values.

13. The apparatus of claim 11, further comprising:
the apparatus is configured to present the next media item to the user and to collect the user interaction history.

14. A method for training a recommendation network, comprising:
identifying a plurality of candidate constraints based on predictions about user preferences;
selecting, using a constraint component of the recommendation network, a constraint from the plurality of candidate constraints for each of a plurality of users, wherein at least one of the plurality of candidate constraints comprises a minimum variability value for a state-action pair;
predicting a media item from a plurality of media items for each of the plurality of users using the recommendation network subject to the selected constraint;
observing interactions of the plurality of users with the predicted media items from the plurality of media items;
measuring lifetime values for the plurality of candidate constraints based on the observed interactions;
selecting a next media item for a user from the plurality of candidate media items using a recommendation network based on the lifetime values;
presenting the next media item to the user;
updating the lifetime values for the users based at least in part on the selected next media item; and
updating parameters of the recommendation network based on the updated lifetime values.

15. The method of claim 14, further comprising:
computing an upper confidence bound for each of the candidate constraints based on the lifetime values, wherein the constraint is selected based on the upper confidence bound.

16. The method of claim 15, wherein:
the upper confidence bound decays over time.

17. The method of claim 14, further comprising:
computing a reward for the next media items based on how the users interact with the next media item, wherein the lifetime values are computed based on the reward.

18. The method of claim 14, further comprising:
determining when the users drop out, wherein the lifetime values are based at least in part on the determination.

19. The method of claim 14, further comprising:
computing dropout probabilities for the users, wherein the next media item is selected based at least in part on the dropout probabilities.

* * * * *